US012368014B2

(12) United States Patent
Zhong et al.

(10) Patent No.: US 12,368,014 B2
(45) Date of Patent: Jul. 22, 2025

(54) HIGH-VOLTAGE DC RELAY

(71) Applicant: Xiamen Hongfa Electric Power Controls Co., Ltd., Xiamen (CN)

(72) Inventors: Shuming Zhong, Xiamen (CN); Jinpin Chen, Xiamen (CN); Chengcan Luo, Xiamen (CN); Wenguang Dai, Xiamen (CN); Songsheng Chen, Xiamen (CN)

(73) Assignee: Xiamen Hongfa Electric Power Controls Co., Ltd., Xiamen (CN)

(*) Notice: Subject to any disclaimer, the term of this patent is extended or adjusted under 35 U.S.C. 154(b) by 0 days.

(21) Appl. No.: 18/665,019

(22) Filed: May 15, 2024

(65) Prior Publication Data

US 2024/0297008 A1 Sep. 5, 2024

Related U.S. Application Data

(63) Continuation of application No. 17/950,256, filed on Sep. 22, 2022, now Pat. No. 12,009,172.

(30) Foreign Application Priority Data

Sep. 23, 2021 (CN) .......................... 202111114966.4
Sep. 23, 2021 (CN) .......................... 202122302163.3

(51) Int. Cl.
*H01H 50/18* (2006.01)
*H01H 50/44* (2006.01)
*H01H 50/54* (2006.01)

(52) U.S. Cl.
CPC .......... *H01H 50/546* (2013.01); *H01H 50/18* (2013.01); *H01H 50/44* (2013.01)

(58) Field of Classification Search
CPC ...... H01H 50/546; H01H 50/18; H01H 50/44; H01H 9/0066; H01H 2050/028; H01H 50/541

(Continued)

(56) References Cited

U.S. PATENT DOCUMENTS 12,009,172 B2 6/2024 Zhong et al.
2016/0035502 A1* 2/2016 Zhong ................ H01H 51/2209 335/170

(Continued)

FOREIGN PATENT DOCUMENTS

CN 110164737 A 8/2019
CN 112309776 A 2/2021

(Continued)

OTHER PUBLICATIONS

Extended European Search Report dated Feb. 17, 2023, in connection with European Application No. 22197257.3.

(Continued)

*Primary Examiner* — Shawki S Ismail
*Assistant Examiner* — Lisa N Homza
(74) *Attorney, Agent, or Firm* — Wolf, Greenfield & Sacks, P.C.

(57) ABSTRACT

The present disclosure discloses a high-voltage DC relay comprising a cover, a main contact leading-out terminal, a coil bobbin, an auxiliary contact leading-out terminal and a coil leading-out terminal, wherein the cover and the coil bobbin are arranged up and down; two main contact leading-out terminals and two auxiliary contact leading-out terminals are respectively fixed on a top wall of the cover and their bottom ends respectively extend into a cavity of the cover; a winding shaft of the coil bobbin is vertically arranged; the coil leading-out terminal is mounted in a flange of the coil bobbin; the high-voltage DC relay also comprises a first connecting assembly and a second connecting assembly, wherein the first connecting assembly is composed of a first plastic element and a first conductive element, the second connecting assembly is composed of a second plastic element and a second conductive element.

11 Claims, 26 Drawing Sheets

(58) Field of Classification Search
USPC .......................................................... 335/185
See application file for complete search history.

(56) References Cited

U.S. PATENT DOCUMENTS

| | | | | |
|---|---|---|---|---|
| 2016/0133404 | A1* | 5/2016 | Zhong .................. | H01H 50/546 335/201 |
| 2019/0006140 | A1* | 1/2019 | Shi ....................... | H01H 50/546 |
| 2020/0035432 | A1* | 1/2020 | Chen .................... | H01H 50/545 |
| 2020/0373111 | A1* | 11/2020 | Zhong .................. | H01H 50/541 |
| 2023/0090245 | A1 | 3/2023 | Zhong et al. | |

FOREIGN PATENT DOCUMENTS

| | | | |
|---|---|---|---|
| CN | 216119975 | U | 3/2022 |
| EP | 3 258 476 | A1 | 12/2017 |
| EP | 3 432 337 | A1 | 1/2019 |
| EP | 3 471 127 | A1 | 4/2019 |
| EP | 3 514 818 | A1 | 7/2019 |
| JP | 2017-134989 | A | 8/2017 |
| JP | 2019-129150 | A | 8/2019 |

OTHER PUBLICATIONS

Japanese Office Action dated Oct. 3, 2023, in connection with Japanese Application No. 2022-151329.

* cited by examiner

HIGH-VOLTAGE DC RELAY

CROSS-REFERENCE TO RELATED APPLICATIONS

This application is a Continuation of U.S. application Ser. No. 17/950,256, filed on Sep. 22, 2022, which claims priority to Chinese Applications No. 202111114966.4 filed on Sep. 23, 2021 and No. 202122302163.3 filed on Sep. 23, 2021, which are both incorporated herein by reference in their entirety.

TECHNICAL FIELD

The present disclosure relates to the technical field of relays, in particular to a high-voltage DC relay.

BACKGROUND

A relay is an electronic control device, which has a control system (also called "input circuit") and a controlled system (also called "output circuit"), and is usually applied to an automatic control circuit, it is actually an "automatic switch" that uses a smaller current to control a larger current. Therefore, it plays a role of automatic adjustment, safety protection, circuit conversion, etc. in the circuit. In the prior art, most of high-voltage DC relays use a manner of movable contact piece direct-acting (also called solenoid direct-acting). A contact part of this DC relay includes two fixed contacts and a movable assembly, the movable assembly includes a movable spring part and a pushing rod assembly, and the movable spring part is composed of a movable contact piece and movable contacts at both ends of the movable contact piece. The movable contact piece is of direct-acting type. When the movable contacts at both ends of the movable contact piece respectively contact with the two fixed contacts (i.e., load leading-out terminals), current flows from one of the fixed contacts, through the movable contact piece, and then out of the other fixed contact. With the rapid development of new energy, some of relays are applied to fields such as new energy vehicles and charging equipment, photovoltaic/wind power generation systems, engineering vehicles and UPS. In the vehicle-mounted market, a space utilization of batteries is optimized as much as possible due to an increasing demand for mileage. In the early stage, high-voltage check is more used for adhesion of relays. At present, an increasing number of customers require the relay itself to have an auxiliary contact function. For a high-voltage DC relay with an auxiliary contact in the prior art, two auxiliary contact leading-out terminals are fixed at a top wall of a ceramic cover and respectively have a bottom end extending into a cavity of the ceramic cover, and the two auxiliary contact leading-out terminals are symmetrically arranged in a middle of two fixed contacts (i.e., main fixed contacts). When a main contact is disconnected, an electric arc is generated, so that metal particles with larger heat are irregularly scattered in the ceramic inner cavity after the electric arc is broken, so that the auxiliary contact structure is contaminated, and may even ablated and damaged, thereby affecting the use function of the auxiliary contact structure.

SUMMARY

An object of the present disclosure is to overcome the deficiencies of the prior art and provide a high-voltage DC relay with an auxiliary contact. With structural improvement, an electric arc generated when the movable and fixed contacts are separated can be prevented from contaminating the auxiliary contact structure, and insulation between strong and weak current can be realized. Also, the auxiliary movable contact piece can also be prevented from being contaminated or deformed by touching the auxiliary movable contact piece during an assembly turnover process.

The technical solution used by the present disclosure to solve the technical problem is as follows: a high-voltage DC relay with an auxiliary contact, including a cover, a main contact leading-out terminal, a pushing rod assembly, a main movable contact piece, an auxiliary contact leading-out terminal and an auxiliary movable contact piece; wherein two main contact leading-out terminals and two auxiliary contact leading-out terminals are respectively fixed on a top wall of the cover and their bottom ends respectively extend into a cavity of the cover, the main movable contact piece is mounted at a top of the pushing rod assembly, and both ends of the main movable contact piece are respectively matched with bottom ends of the two main contact leading-out terminals; two auxiliary contact leading-out terminals are arranged on both sides of a connecting line between the two main contact leading-out terminals, the auxiliary movable contact piece is arranged at a top end of the pushing rod assembly, and two ends of the auxiliary movable contact piece are respectively matched with bottom ends of the two auxiliary contact leading-out terminals; the auxiliary movable contact piece is also connected with a plastic body; and in the plastic body, a plastic blocking wall is respectively arranged between each of two sides of the plastic body corresponding to both ends of the auxiliary movable contact piece and the main contact leading-out terminal, so as to block contamination of the auxiliary contact structure caused by an electric arc generated when a movable contact is separated from a fixed contact.

A connecting line between the two auxiliary contact leading-out terminals is vertically intersected with the connecting line between the two main contact leading-out terminals.

A midpoint of the connecting line between the two auxiliary contact leading-out terminals is coincided with a midpoint of the connecting line between the two main contact leading-out terminals.

The plastic body includes a middle plastic body in which a middle part of the auxiliary movable contact piece is wrapped and two U-shaped plastic bodies connected to both sides of the middle plastic body, U-shaped bottom walls of the two U-shaped plastic bodies are integrally connected with both sides of the middle plastic body respectively, and two U-shaped side walls of each of the two U-shaped plastic bodies are respectively disposed on both sides of a width of both ends of the auxiliary movable contact piece to form the blocking wall.

The plastic body also includes a bottom plastic body, and the bottom plastic body is connected to bottom surfaces of the middle plastic body and the U-shaped plastic body, so that the auxiliary movable contact piece is insulated from the main movable contact piece arranged therebelow.

The pushing rod assembly includes a U-shaped bracket and a spring, and the main movable contact piece presses against an inner side of a top wall of the U-shaped bracket through the spring; the bottom plastic body is also connected with a fixing sheet, and the plastic body is fixed on the top wall of the U-shaped bracket through the fixing sheet.

The fixing sheet is provided with a protrusion protruding downwards, and the fixing sheet is fixed with the U-shaped bracket through the protrusion by riveting.

In the middle plastic body, first notches are provided at positions corresponding to the two U-shaped side walls of the U-shaped plastic body.

U-shaped bending parts for increasing elasticity of both ends of the auxiliary movable contact piece are arranged in both ends of the auxiliary movable contact piece and close to a junction with the U-shaped bottom wall of the U-shaped plastic body, and a U-shaped opening of each of the U-shaped bending parts opens downwards.

The cover may be a ceramic cover.

Compared with the prior art, the present disclosure has advantages as follows:

1. In the present disclosure, the plastic body connected with the auxiliary movable contact piece is used, and a plastic blocking wall is respectively arranged between each of two sides of the plastic body corresponding to both ends of the auxiliary movable contact piece and the main contact leading-out terminal. According to the structure of the present disclosure, the plastic blocking wall may be used to block the contamination of the auxiliary contact structure caused by the electric arc generated when the movable contact is separated from the fixed contact.

2. In the present disclosure, the plastic body includes a middle plastic body in which a middle part of the auxiliary movable contact piece is wrapped, two U-shaped plastic bodies connected to both sides of the middle plastic body, and a bottom plastic body; U-shaped bottom walls of the two U-shaped plastic bodies are integrally connected with both sides of the middle plastic body respectively, and two U-shaped side walls of each of the two U-shaped plastic bodies are respectively disposed on both sides of a width of both ends of the auxiliary movable contact piece to form the blocking wall, and the bottom plastic body is connected to bottom surfaces of the middle plastic body and the U-shaped plastic body. According to the structure of the present disclosure, both ends of the auxiliary movable contact piece are enclosed in an area surrounded by the U-shaped plastic body and the bottom plastic body, so that the auxiliary movable contact piece may be insulated from the main movable contact piece arranged therebelow; also, the auxiliary movable contact piece can also be prevented from being contaminated or deformed by touching the auxiliary movable contact piece during an assembly turnover process.

The present disclosure will be further explained in detail with reference to the following drawings and examples; however, the high-voltage DC relay with an auxiliary contact of the present disclosure is not limited thereto.

DETAILED DESCRIPTION

Embodiment

Figure 1:
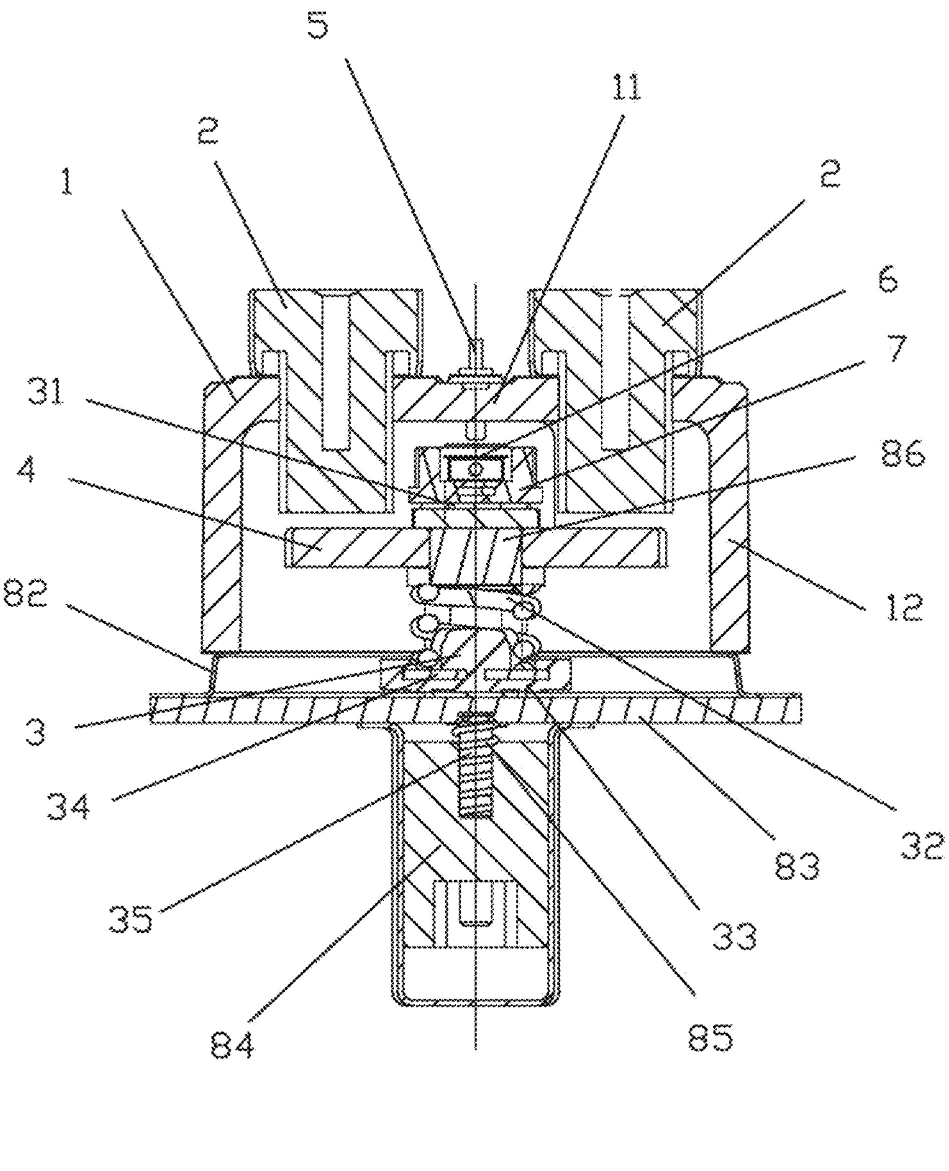
FIG. 1 is a schematic view of a partial structure of an embodiment of the present disclosure.
Figure 2:
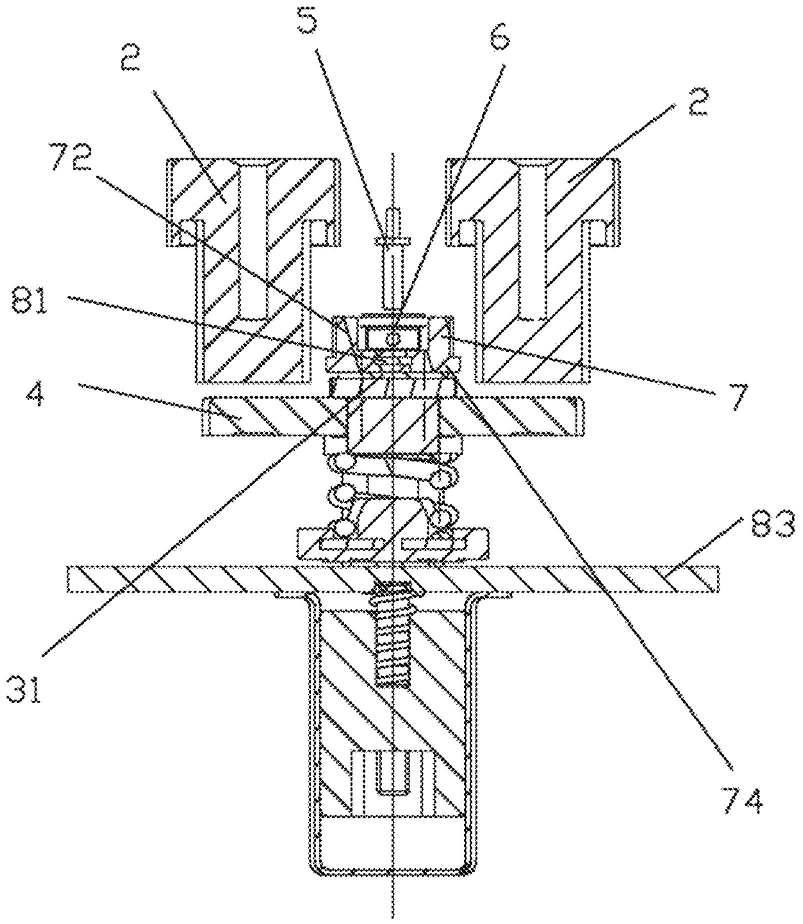
FIG. 2 is a schematic view of a partial structure of the embodiment of the present disclosure (without a cover and a frame)
Figure 3:
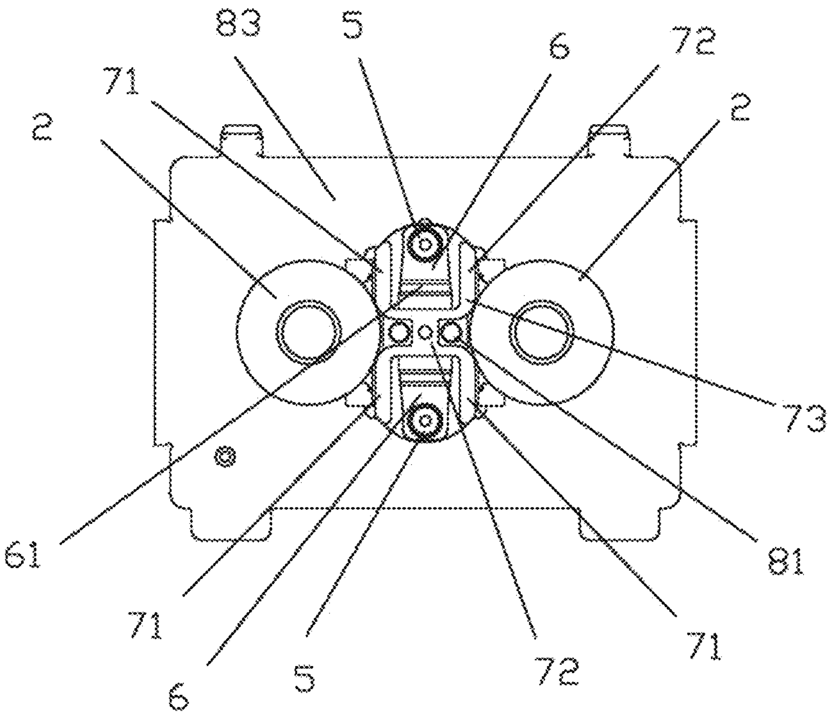
FIG. 3 is a top view of a partial structure of the embodiment of the present disclosure (without the cover and the frame)
Figure 4:
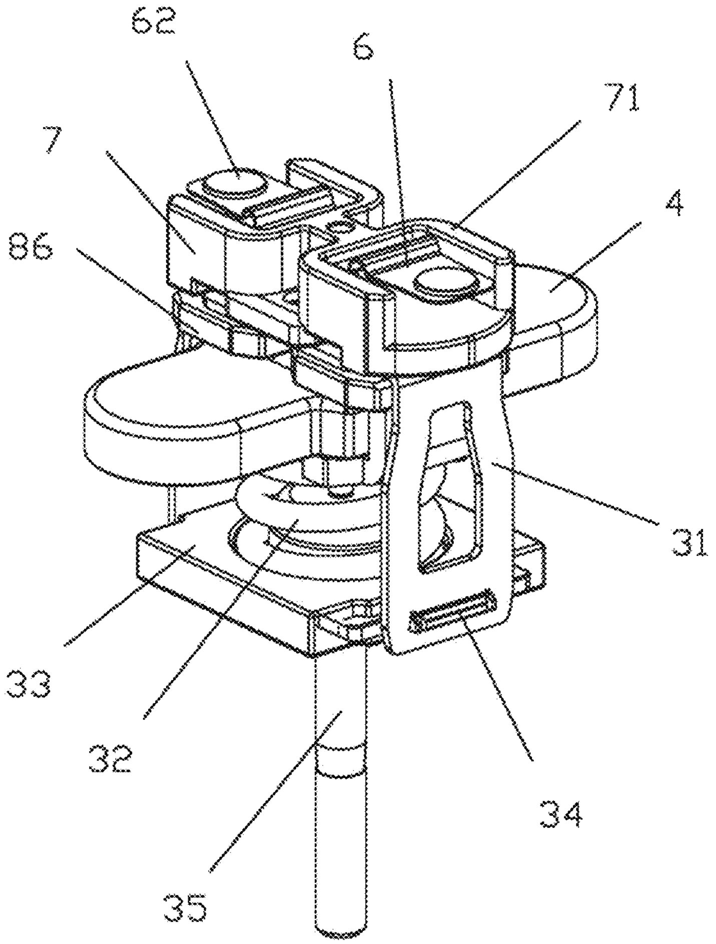
FIG. 4 is a structural perspective schematic view of the embodiment of the present disclosure, in which a pushing rod assembly is matched with an auxiliary movable contact piece, a plastic body and a fixing sheet.
Figure 5:
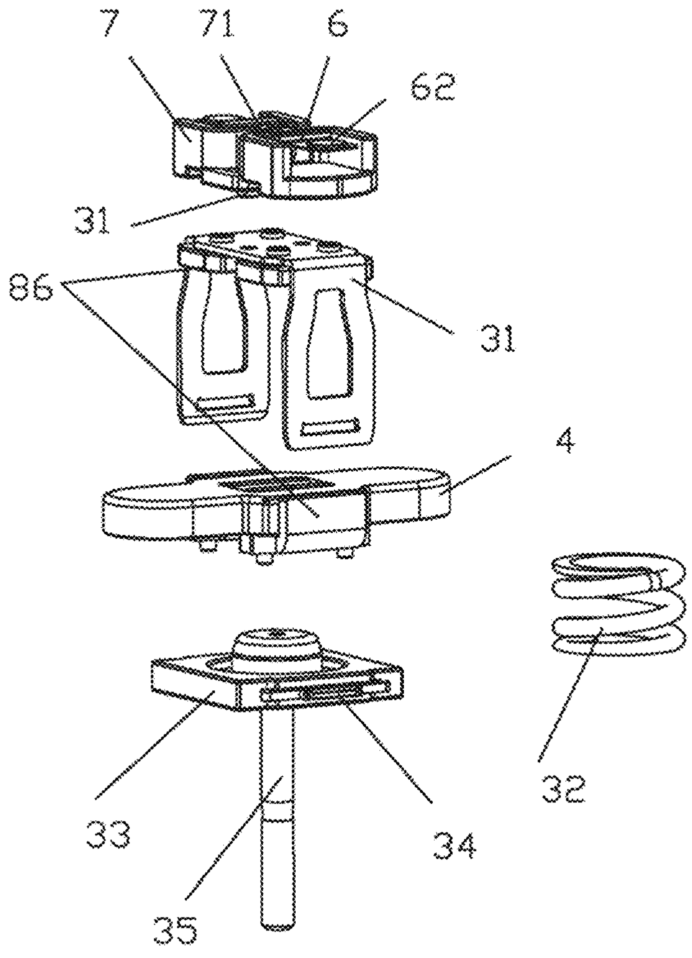
FIG. 5 is a structural perspective exploded schematic view of the embodiment of the present disclosure, in which the pushing rod assembly is matched with the auxiliary movable contact piece, the plastic body and the fixing sheet.
Figure 6:
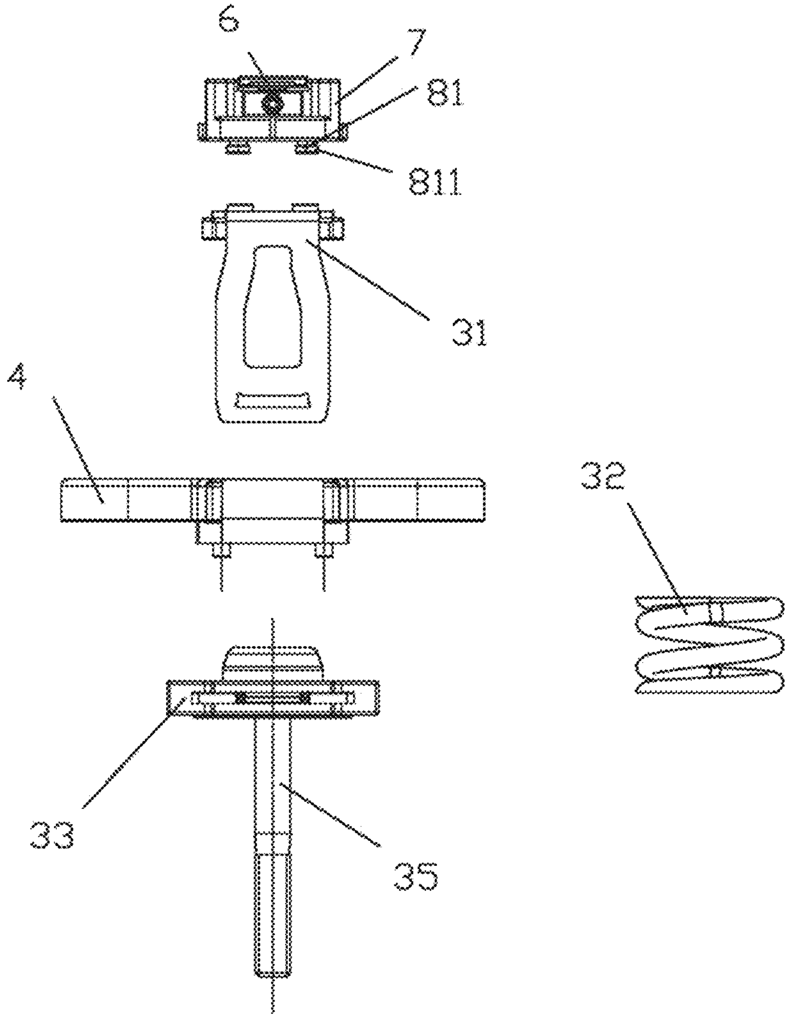
FIG. 6 is a structural exploded front view of the embodiment of the present disclosure, in which the pushing rod assembly is matched with the auxiliary movable contact piece, the plastic body and the fixing sheet.
Figure 7:
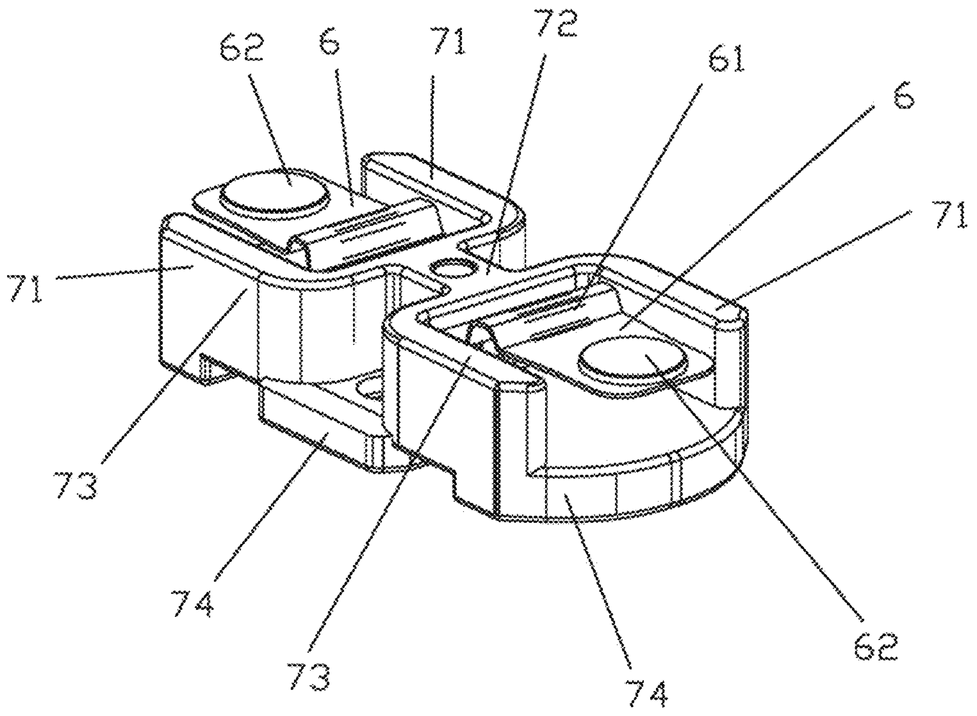
FIG. 7 is a schematic structural perspective view of the embodiment of the present disclosure, in which the auxiliary movable contact piece, the plastic body and the fixing sheet are matched with each other.
Figure 8:
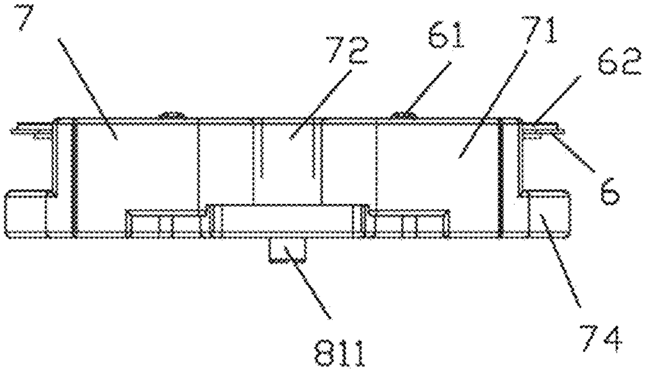
FIG. 8 is a front view of the embodiment of the present disclosure, in which the auxiliary movable contact piece, the plastic body and the fixing sheet are matched with each other.
Figure 9:
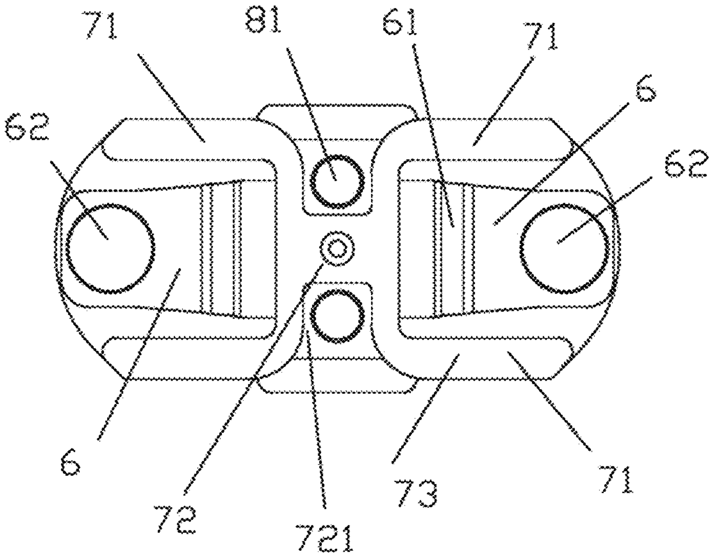
FIG. 9 is a top view of the embodiment of the present disclosure, in which the auxiliary movable contact piece, the plastic body and the fixing sheet are matched with each other.
Figure 10:
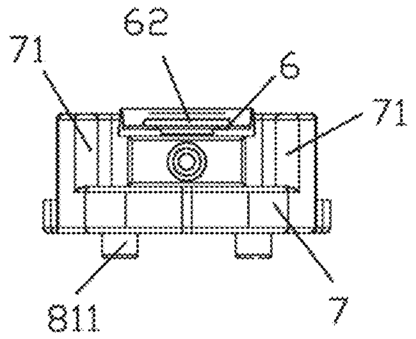
FIG. 10 is a side view of the embodiment of the present disclosure, in which the auxiliary movable contact piece, the plastic body and the fixing sheet are matched with each other.
Figure 11:
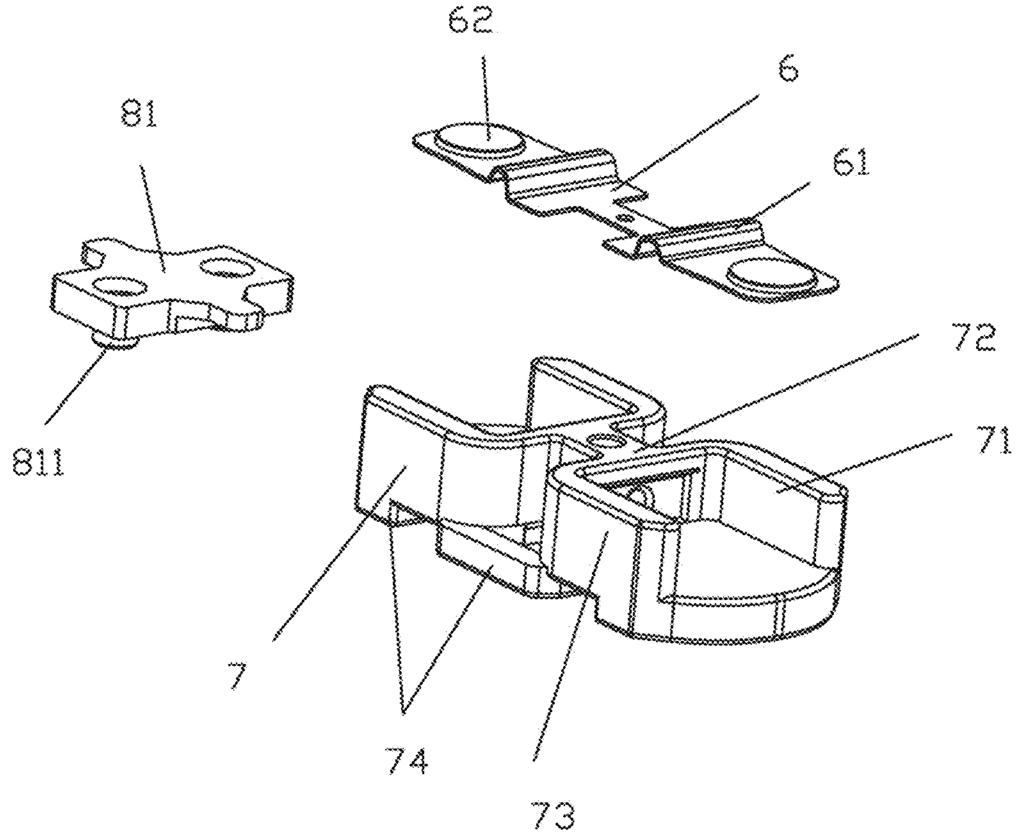
FIG. 11 is a structural perspective exploded schematic view of the embodiment of the present disclosure, in which the auxiliary movable contact piece, the plastic body and the fixing sheet are matched with each other.
Figure 12:
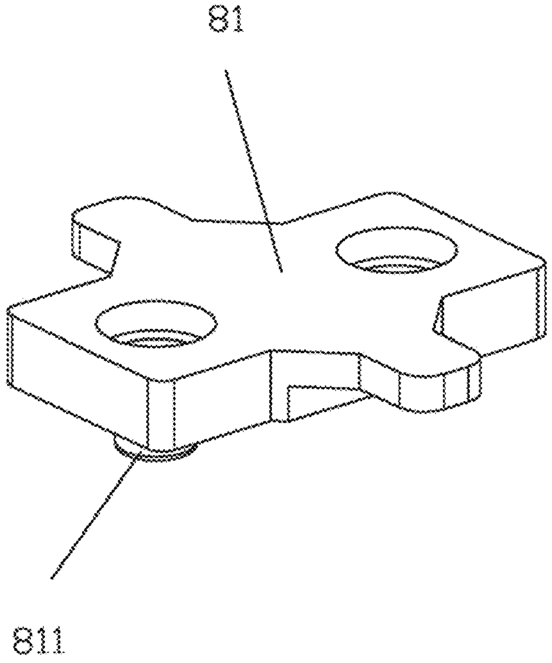
FIG. 12 is a schematic structural perspective view of the fixing sheet of the embodiment of the present disclosure.
Figure 13:
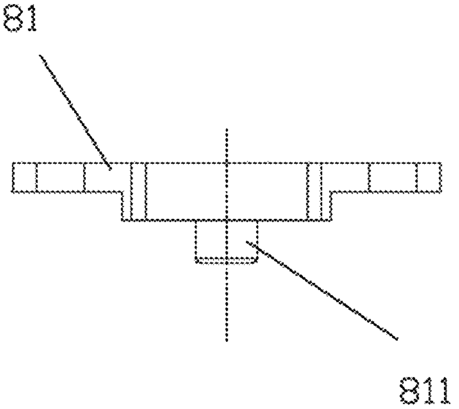
FIG. 13 is a front view of the fixing sheet of the embodiment of the present disclosure.
Figure 14:
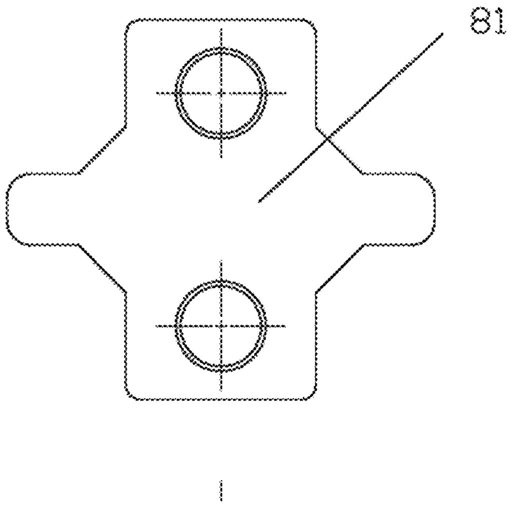
FIG. 14 is a top view of the fixing sheet of the embodiment of the present disclosure.
Figure 15:
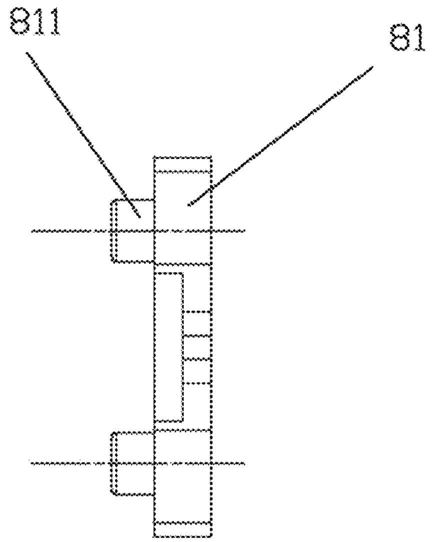
FIG. 15 is a side view of the fixing sheet of the embodiment of the present disclosure.

Referring to FIGS. 1 to 7, a high-voltage DC relay with an auxiliary contact according to the present disclosure includes a cover 1, a main contact leading-out terminal 2, a pushing rod assembly 3, a main movable contact piece 4, an auxiliary contact leading-out terminal 5 and an auxiliary movable contact piece 6. The cover may be a ceramic cover. Two main contact leading-out terminals 2 and two auxiliary contact leading-out terminals 5 are respectively fixed on a top wall 11 of the cover 1 and their bottom ends extend into a cavity of the cover 1, the cover 1 is composed of the top wall 11 and side walls 12. The main movable contact piece 4 is mounted on a top of the pushing rod assembly 3, and both ends (i.e. main movable contacts) of the main movable contact piece 4 are respectively matched with bottom ends (i.e. main fixed contacts) of the two main contact leading-out terminals 2. The two auxiliary contact leading-out terminals 5 are arranged on both sides of a connecting line between the two main contact leading-out terminals 2, the auxiliary movable contact piece 6 is mounted on the top of the pushing rod assembly 3, a movable contact 62 is provided on each of both ends of the auxiliary movable contact piece 6, and movable contacts 62 at both ends of the auxiliary movable contact piece 6 are respectively matched with the bottom ends of the two auxiliary contact leading-out terminals (i.e. auxiliary fixed contacts). The auxiliary movable contact piece 6 is also connected with a plastic body 7. In the plastic body 7, a plastic blocking wall 71 is respectively arranged between each of two sides of the plastic body corresponding to both ends of the auxiliary movable contact piece 6 and the main contact leading-out terminal 2, so that the blocking wall 71 may be used to block contamination of the auxiliary contact structure caused by an electric are generated when a movable contact is separated from a fixed contact.

In this embodiment, a connecting line between the two auxiliary contact leading-out terminals 5 is vertically intersected with the connecting line between the two main contact leading-out terminals 2.

In this embodiment, a midpoint of the connecting line between the two auxiliary contact leading-out terminals 5 is coincided with a midpoint of the connecting line between the two main contact leading-out terminals 2.

In this embodiment, the plastic body 7 includes a middle plastic body 72 in which a middle part of the auxiliary movable contact piece 6 is wrapped and two U-shaped plastic bodies 73 connected to both sides of the middle plastic body, U-shaped bottom walls of the two U-shaped plastic bodies 73 are integrally connected with both sides of the middle plastic body 72 respectively, and two U-shaped side walls of each of the two U-shaped plastic bodies 73 are respectively disposed on both sides of a width of both ends of the auxiliary movable contact piece 6 to form the blocking wall 71.

In this embodiment, the plastic body 7 also includes a bottom plastic body 74, and the bottom plastic body 74 is connected to bottom surfaces of the middle plastic body 72 and the U-shaped plastic body 73, so that the auxiliary movable contact piece 6 is insulated from the main movable contact piece 4 arranged therebelow.

In this embodiment, the pushing rod assembly 3 includes a U-shaped bracket 31 and a spring 32, and the main movable contact piece 4 presses against an inner side of a top wall of the U-shaped bracket 31 through the spring 32; the bottom plastic body 74 is also connected with a fixing sheet 81, and the plastic body 7 is fixed on the top wall of the U-shaped bracket 31 through the fixing sheet 81.

In this embodiment, the fixing sheet 81 is provided with a protrusion 811 protruding downwards, and the fixing sheet 81 is fixed with the U-shaped bracket 31 through the protrusion 811 by riveting.

In this embodiment, in the middle plastic body 72, first notches 721 are provided at positions corresponding to the two U-shaped side walls of the U-shaped plastic body 73.

In this embodiment, U-shaped bending parts 61 for increasing elasticity of both ends of the auxiliary movable contact piece are arranged in both ends of the auxiliary movable contact piece and close to a junction with the U-shaped bottom wall of the U-shaped plastic body 73, and a U-shaped opening of each of the U-shaped bending part 61 opens downwards.

When the plastic body 7, the auxiliary movable contact piece 6 and the fixing sheet 81 are combined, the auxiliary movable contact piece 6 and the fixing sheet 81 may be fixed in the plastic body 7 by insert-injection-molding when the plastic body 7 is formed. Alternatively, the plastic body 7 may be molded and injected, and then the auxiliary movable contact piece 6 and the fixing sheet 81 are mounted on the plastic body 7. Alternatively, the middle plastic body 72, the U-shaped plastic body 73, and a part of the bottom plastic body 74 of the plastic body 7 and the auxiliary movable contact piece 6 may be integrally formed as a part by insert-injection-molding, and the other part of the bottom plastic body 74 and the fixing sheet 81 may be integrally formed as another part by insert-injection-molding, and then these two parts may be assembled together.

According to a high-voltage DC relay with an auxiliary contact of the present disclosure, the pushing rod assembly 3 also includes a spring seat 33, a fixing sheet 34 and a pushing rod 35. The spring seat 33 is formed by insert-injection-molding, and the fixing sheet 34 and the pushing rod 35 are fixed in the spring seat 33 during injection-molding. Two side walls of the U-shaped bracket 31 are respectively connected with the fixing sheet 34. The high-voltage DC relay also includes a frame 82, a yoke iron plate 83, a movable iron core 84, a return spring 85, an anti-short-circuit ring 86 and other components.

In the high-voltage DC relay with the auxiliary contact of the present disclosure, in the plastic body 7 connected with the auxiliary movable contact piece 6, and a plastic blocking wall 71 is respectively arranged between each of two sides of the plastic body corresponding to both ends of the auxiliary movable contact piece 6 and the main contact leading-out terminal 2. According to the structure of the present disclosure, the plastic blocking wall 71 may be used to prevent the contamination of the auxiliary contact structure caused by an electric arc generated when the movable contact is separated from the fixed contact.

In the high-voltage DC relay with the auxiliary contact of the present disclosure, the plastic body 7 includes a middle plastic body 72 in which a middle part of the auxiliary movable contact piece is wrapped, two U-shaped plastic bodies 73 connected to both sides of the middle plastic body, and a bottom plastic body 74; U-shaped bottom walls of the two U-shaped plastic bodies 73 are integrally connected with both sides of the middle plastic body 72 respectively, and two U-shaped side walls of each of the two U-shaped plastic bodies 73 are respectively disposed on both sides of a width of both ends of the auxiliary movable contact piece 6 to form the blocking wall 71, and the bottom plastic body 74 is connected to bottom surfaces of the middle plastic body 72 and the U-shaped plastic body 73. According to the structure of the present disclosure, both ends of the auxiliary movable contact piece 6 are enclosed in an area surrounded by the U-shaped plastic body 73 and the bottom plastic body 74, so that the auxiliary movable contact piece 6 may be insulated from the main movable contact piece 2 arranged therebelow; also, the auxiliary movable contact piece can also be prevented from being contaminated or deformed by touching the auxiliary movable contact piece during an assembly turnover process.

In the prior art, a high-voltage DC relay usually uses a structure of movable contact piece direct-acting (also called solenoid direct-acting). A contact part of the high-voltage DC relay includes two fixed contacts (i.e., load leading-out terminals) and a movable assembly, and the movable assembly includes a movable spring part and a pushing rod assembly. The movable spring part is bridge-fitted between the two fixed contacts and mounted on the top of the pushing rod assembly. Through a reciprocating motion of the pushing rod assembly, the two movable contacts of the movable spring part are respectively in contact with or separated from the two fixed contacts. When they are contacted, current flows from one of the fixed contacts, through the movable spring part, and then out of the other fixed contact. With the rapid development of new energy, some of relays are applied to fields such as new energy vehicles and charging equipment, photovoltaic/wind power generation systems, engineering vehicles and UPS. In the vehicle-mounted market, a space utilization of batteries is optimized as much as possible due to an increasing demand for mileage. In the early stage, high-voltage check is more used for adhesion of relays. At present, an increasing number of customers require the relay itself to have an auxiliary contact function. For a high-voltage DC relay with an auxiliary contact in the prior art, an auxiliary contact leading-out terminal is usually fixed on a top wall of a cover by brazing. However, in the application of new energy field, a leading-out part of the auxiliary contact leading-out terminal needs to be placed at a bottom of the relay to lead out in the same direction as a leading-out direction of the coil, for example, a four-Pin connector is used for quick plugging-in and leading-out. On the other hand, since the auxiliary contact leading-out terminal and the main contact leading-out terminal (i.e., the fixed contact) are both located on the top wall of the cover, so that the strong and weak current cannot achieve protection and isolation function.

An object of the present disclosure is to overcome the deficiencies of the prior art and provide a high-voltage DC relay. With structural improvement, the leading-out part of the auxiliary contact leading-out terminal may be placed at a bottom of the relay to lead out in the same direction as a leading-out direction of the coil, also protecting the strong and weak voltage terminals.

The technical solution used by the present disclosure to solve the technical problem is as follows: a high-voltage DC relay includes a cover, a main contact leading-out terminal, a coil bobbin, an auxiliary contact leading-out terminal and a coil leading-out terminal; the cover and the coil bobbin are arranged up and down; two main contact leading-out terminals and two auxiliary contact leading-out terminals are respectively fixed on a top wall of the cover and their bottom ends respectively extend into a cavity of the cover; a winding shaft of the coil bobbin is vertically arranged; the coil leading-out terminal is mounted in a flange of the coil bobbin, and a leading-out section of the coil leading-out terminal is led outwards; the relay also includes a first connecting assembly and a second connecting assembly; the first connecting assembly is composed of a first plastic element and a first conductive element arranged in the first plastic element; the second connecting assembly is composed of a second plastic element and a second conductive element arranged in the second plastic element; the first connecting assembly is disposed on a top surface of the cover, and the second connecting assembly is disposed on side surfaces of the cover and the coil bobbin; an upper end of the second conductive element is provided as a pin structure, and a lower end of the second conductive element is provided as a leading-out pin which leads out in the same direction as the leading-out section of the coil leading-out terminal; both ends of the first conductive element are respectively provided as electrical connection sockets, and are respectively inserted and then welded and fixed with the auxiliary contact leading-out terminal and the pin structure of the second conductive element.

The coil leading-out terminal is mounted in a lower flange of the coil bobbin.

The coil leading-out terminal is fixed in the lower flange of the coil bobbin by insert-injection-molding.

The first conductive element is fixed in the first plastic element by insert-injection-molding.

The first plastic element is provided with holes for making place adapted to the main contact leading-out terminals, and the two holes for making place are correspondingly matched with the two main contact leading-out terminals by using the first plastic element to realize positioning of the first plastic element at the top surface of the cover.

The second conductive element is fixed in the second plastic element by insert-injection-molding.

The relay also includes a U-shaped yoke, and the U-shaped yoke is surrounded by a bottom surface and two opposite sides of the coil bobbin; the second connecting assembly corresponds to an outer side of one of the U-shaped side walls of the U-shaped yoke, a surface of the second plastic element facing towards the U-shaped yoke is provided with at least one plastic protrusion, one of the U-shaped side walls of the U-shaped yoke is provided with at least one through hole which may be matched with the plastic protrusion of the second plastic element, and the plastic protrusion of the second plastic element is in interference fit with the through hole of the U-shaped yoke.

The leading-out section of the coil leading-out terminal is bent into an upward L-shape; the leading-out pin of the second conductive element is bent into a U-shape, and is arranged with the leading-out section of the coil leading-out terminal to form a plug-in structure with pins facing upwards.

The second plastic element is a separate part which is pre-injection-molded, the second plastic element is provided with an embedded groove, and the second conductive element is embedded in and in interference fit with the embedded groove of the second plastic element.

The embedded groove of the second plastic element is provided with at least one positioning projection, the second conductive element is provided with at least one positioning hole, and the second conductive element is positioned in the embedded groove of the second plastic element through matching of the positioning hole and the positioning projection of the second plastic element.

The relay also includes a U-shaped yoke, and the U-shaped yoke is surrounded by the bottom surface and two opposite sides of the coil bobbin; the second connecting assembly is correspondingly arranged next to the U-shaped side wall of the U-shaped yoke; a boss or a slot which may be matched with each other is arranged between a surface of the second plastic element facing away from the embedded groove and an edge of the U-shaped side wall of the U-shaped yoke, and the second plastic element is fixed with the U-shaped yoke by matching the boss and the groove which correspond to each other.

Compared with the prior art, the present disclosure has advantages as follows:

According to the present disclosure, the first connecting assembly is disposed on a top surface of the cover, and the second connecting assembly is disposed on side surfaces of the cover and the coil bobbin; an upper end of the second conductive element is provided as a pin structure, and a lower end of the second conductive element is provided as a leading-out pin which leads out in the same direction as the leading-out section of the coil leading-out terminal; both ends of the first conductive element are respectively provided as electrical connection sockets, and are respectively inserted and then welded and fixed with the auxiliary contact leading-out terminal and the pin structure of the second conductive element. According to the structure of the present disclosure, the auxiliary contact leading-out terminal is led from the top end of the cover to the bottom end of the relay by matching of two separate parts (i.e., the first connecting assembly and the second connecting assembly), thereby solving a problem that the auxiliary connecting assembly has two contradictory assembling directions, and realizing reliable fixing and accurate positioning of the connecting assembly; also, avoiding that when one auxiliary connecting assembly is provided, the conductive element is difficult to be formed at 90 degrees at the bending position, preventing that the leading-out pin at a bottom connecting part (customer plug connector) cannot be effectively and reliably fixed since the part will rebound after bent at a R angle, which leads to difficulties in subsequent assembly of the housing, and further avoiding production problems such as shaking of the connecting assembly during the turnover process.

First Embodiment

Figure 16:
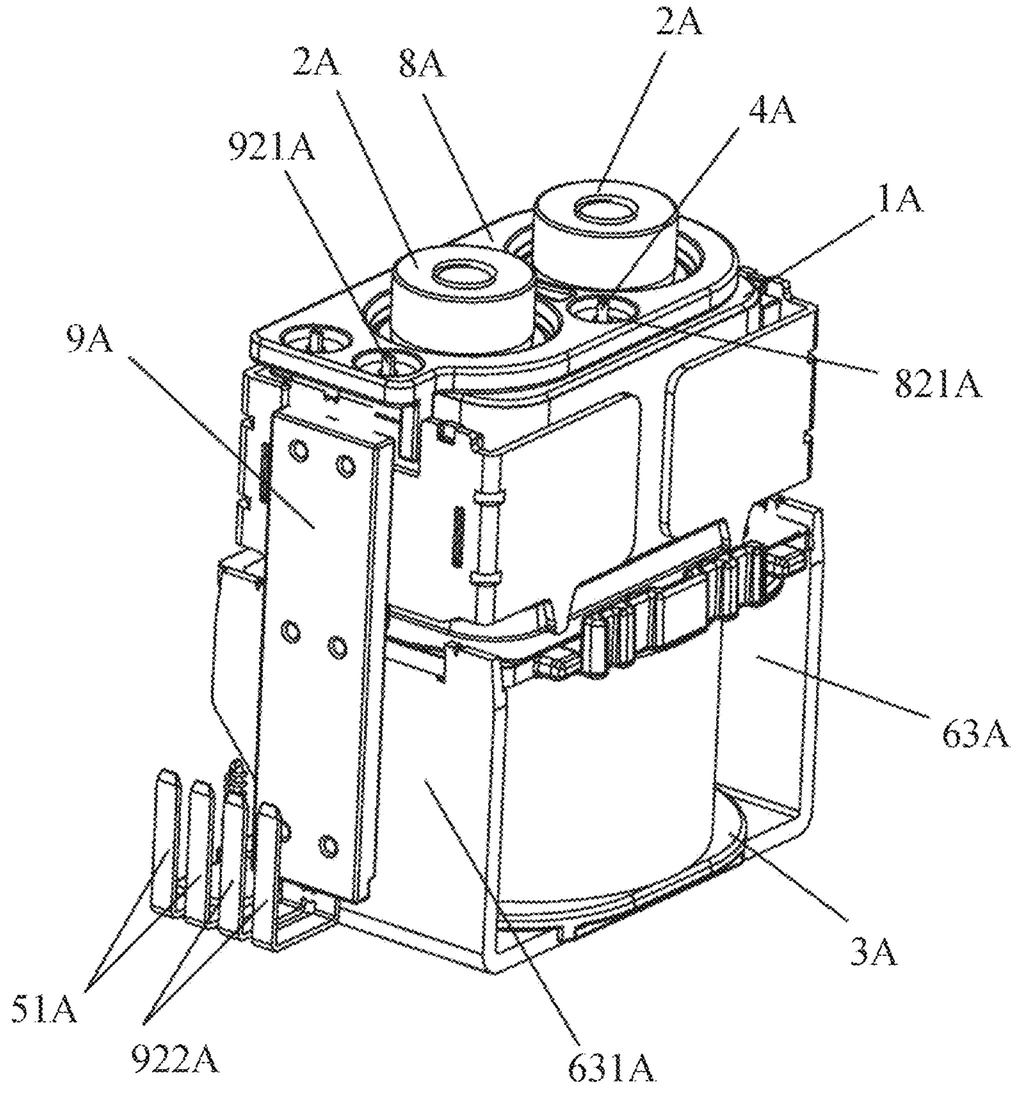
FIG. 16 is a schematic structural perspective view of a first embodiment of the present disclosure (excluding a housing, the same as described below)
Figure 17:
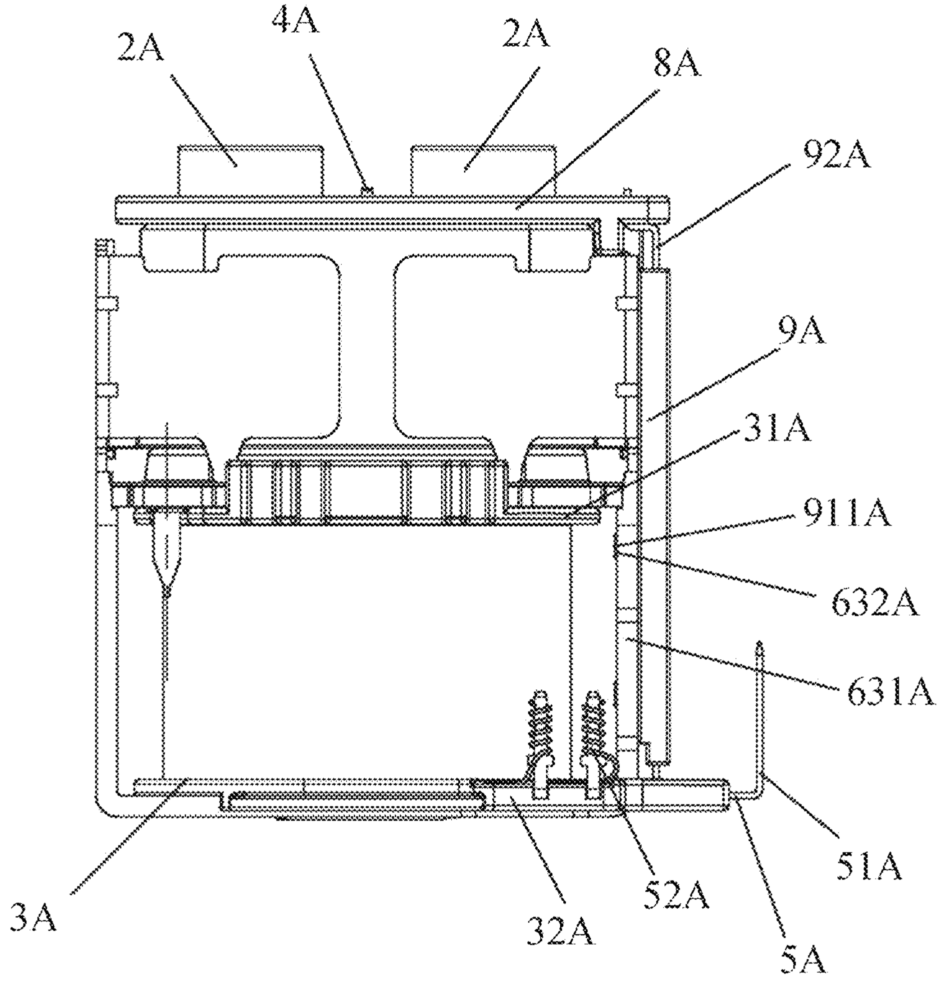
FIG. 17 is a front view of the first embodiment of the present disclosure.
Figure 18:
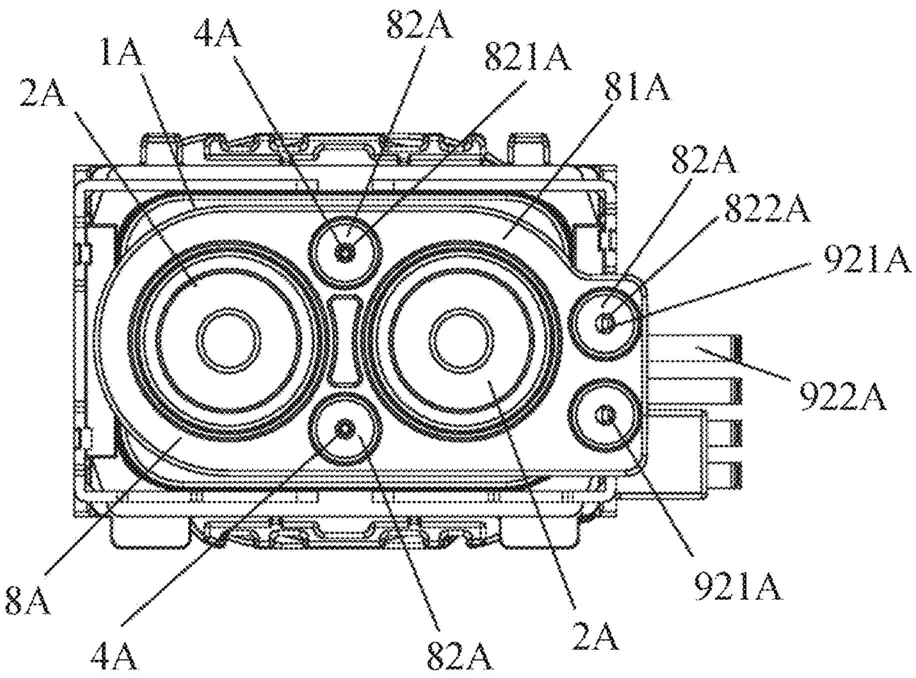
FIG. 18 is a top view of the first embodiment of the present disclosure.
Figure 19:
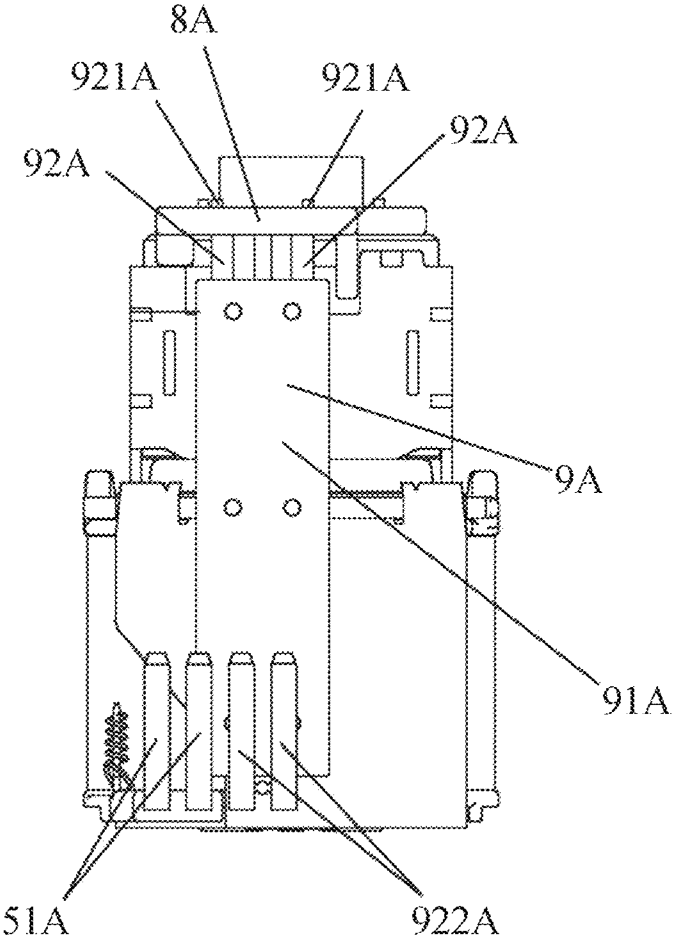
FIG. 19 is a side view of the first embodiment of the present disclosure.
Figure 20:
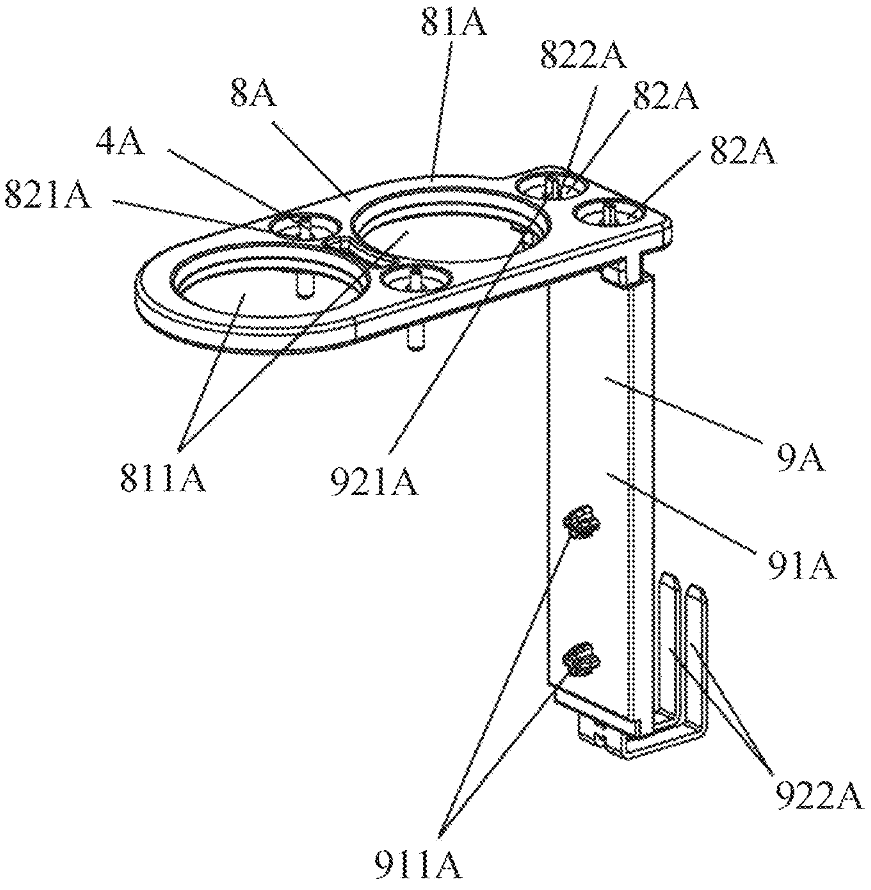
FIG. 20 is a schematic structural perspective view of the first embodiment of the present disclosure, in which a first connecting assembly is matched with a second connecting assembly.
Figure 21:
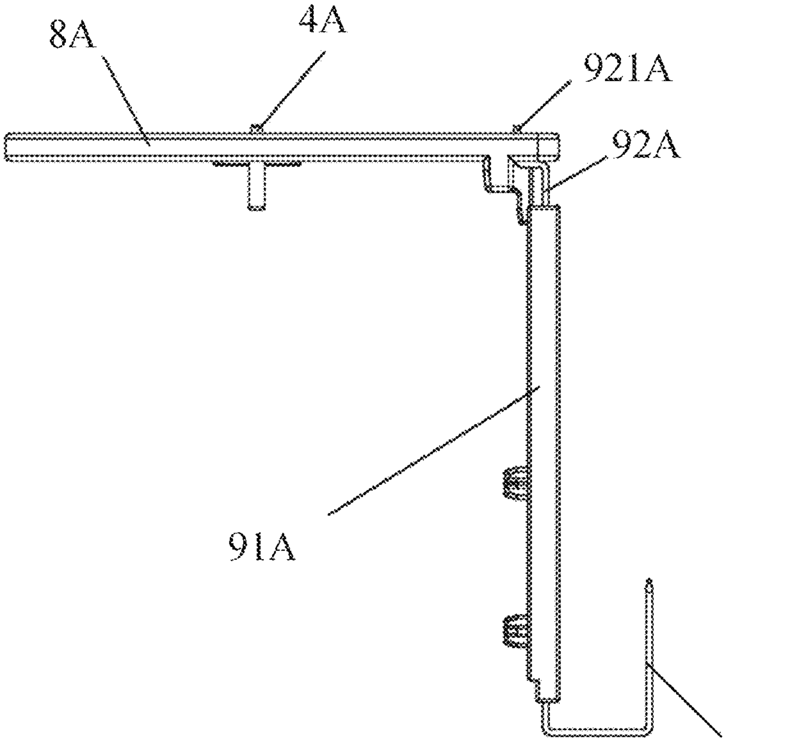
FIG. 21 is a front view of the first embodiment of the present disclosure, in which the first connecting assembly is matched with the second connecting assembly.
Figure 22:
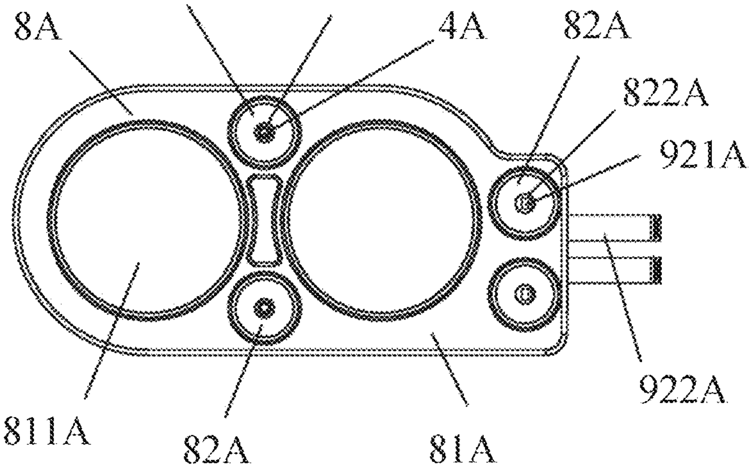
FIG. 22 is a top view of the first embodiment of the present disclosure, in which the first connecting assembly is matched with the second connecting assembly.
Figure 23:
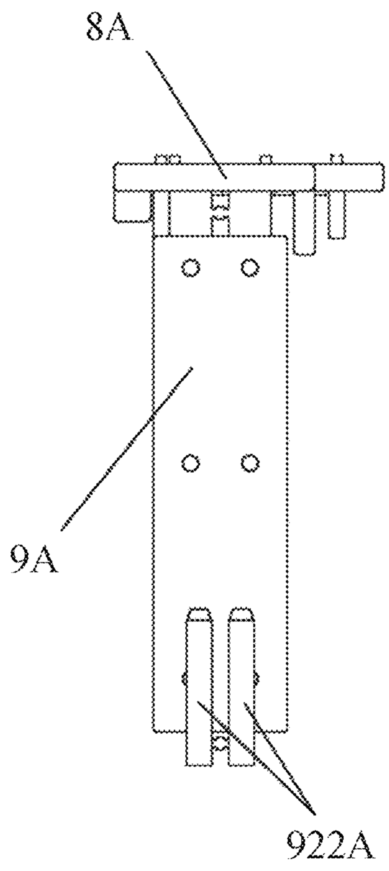
FIG. 23 is a side view of the first embodiment of the present disclosure, in which the first connecting assembly is matched with the second connecting assembly.
Figure 24:
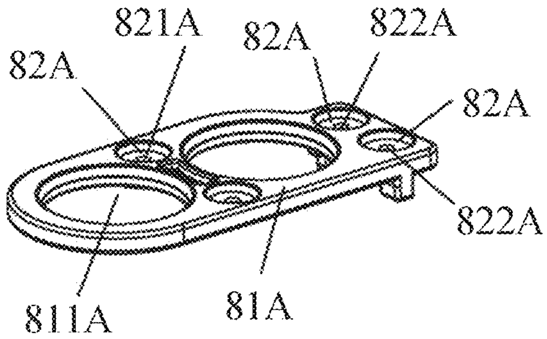
FIG. 24 is a schematic structural perspective view of the first connecting assembly of the first embodiment of the present disclosure.
Figure 25:
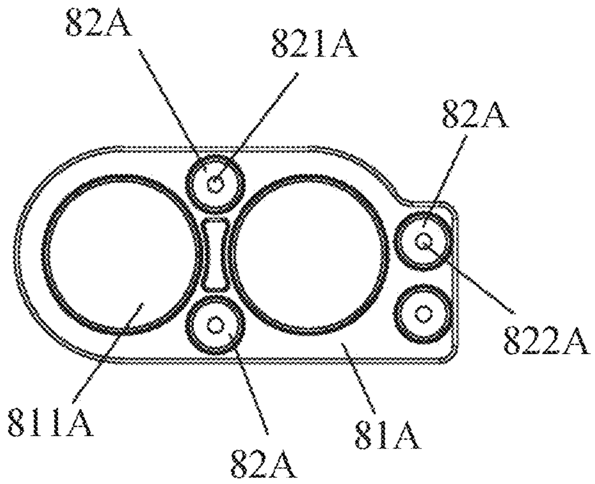
FIG. 25 is a top view of the first connecting assembly of the first embodiment of the present disclosure.
Figure 26:
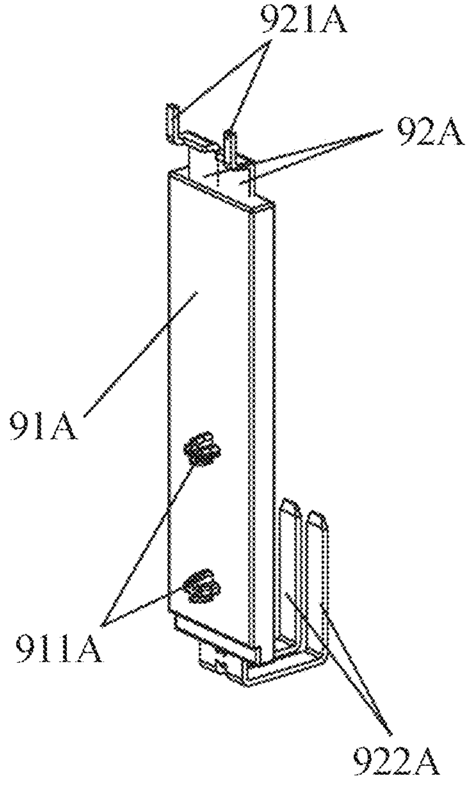
FIG. 26 is a schematic structural perspective view of the second connecting assembly of the first embodiment of the present disclosure.
Figure 27:
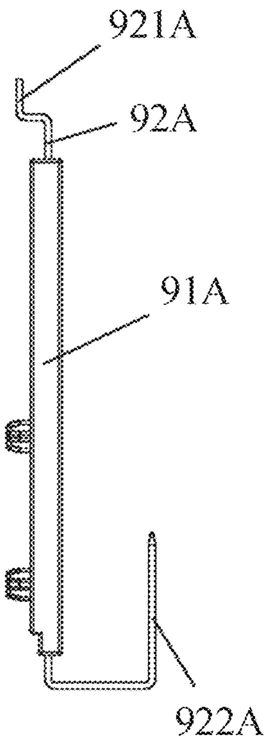
FIG. 27 is a front view of the second connecting assembly of the first embodiment of the present disclosure.
Figure 28:
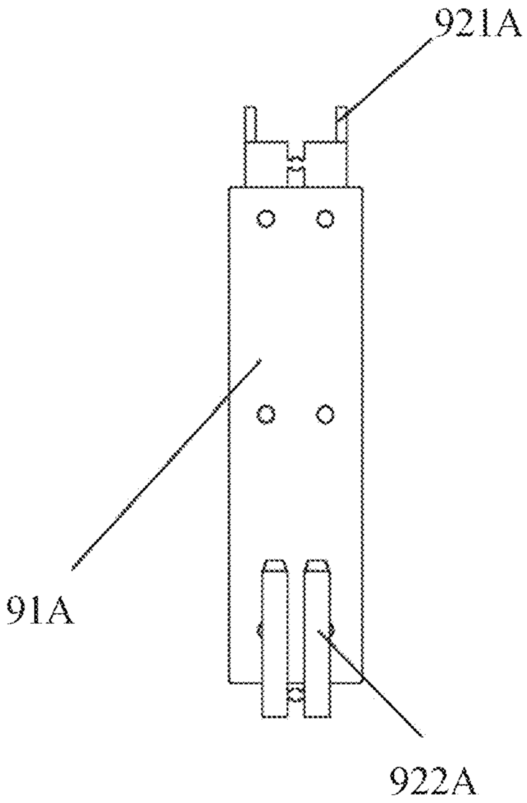
FIG. 28 is a side view of the second connecting assembly of the first embodiment of the present disclosure.

Referring to FIGS. 16 to 28, a high-voltage DC relay of the present disclosure includes a cover 1A, a main contact leading-out terminal 2A (i.e., main fixed contact), a coil bobbin 3A, an auxiliary contact leading-out terminal 4A (i.e., auxiliary fixed contact) and a coil leading-out terminal 5A. The cover 1A and the coil bobbin 3A are arranged up and down; two main contact leading-out terminals 2A and two auxiliary contact leading-out terminals 4A are respectively fixed on a top wall of the cover 1A and their bottom ends respectively extend into a cavity of the cover 1A, which is composed of a top wall and four side walls; the relay also includes components (not shown) such as a main movable contact piece, an auxiliary movable contact piece and a pushing rod assembly. The main movable contact piece is fitted under the two main contact leading-out terminals 2A, the auxiliary movable contact piece is fitted under the two auxiliary contact leading-out terminals 4A, and the main movable contact piece and the auxiliary movable contact piece are respectively mounted on the pushing rod assembly. A winding shaft of the coil bobbin 3A is vertically arranged, and the coil bobbin 3A has an upper flange 31A, a lower flange 32A and the winding shaft between the upper flange 31A and the lower flange 32A. The coil leading-out terminal 5A is mounted in the lower flange 32A of the coil bobbin, a leading-out section 51A of the coil leading-out terminal 5A is led outwards, and the coil leading-out terminal 5A is also provided with a winding section 52A. The relay also includes a first connecting assembly 8A and a second connecting assembly 9A. The first connecting assembly 8A is composed of a first plastic element 81A and a first conductive element 82A arranged in the first plastic element 81A. The second connecting assembly 9A is composed of a second plastic element 91A and a second conductive element 92A arranged in the second plastic element 91A. The first connecting assembly 8A is disposed on a top surface of the cover 1A, and the second connecting assembly 9A is disposed on side surfaces of the cover 1A and the coil bobbin 3A. An upper end of the second conductive element 92A is provided as a pin structure 921A, and a lower end of the second conductive element 92A is provided as a leading-out pin 922A which leads out in the same direction as the leading-out section 51A of the coil leading-out terminal 5A. Both ends of the first conductive element 82A are respectively provided as electrical connection sockets 821A and 822A, one of which, i.e., the electrical connection socket 821A is inserted and then welded and fixed with the upper end of the auxiliary contact leading-out terminal 4A, and the other of which, i.e., electrical connection socket 822A is inserted and then welded and fixed with the pin structure 921A of the second conductive element 92A. In this way, the auxiliary contact leading-out terminal 4A is led from the top surface of the cover 1A to the bottom of the relay through the first conductive element 82A of the first connecting assembly 8A and the second conductive element 92A of the second connecting assembly 9A. Since two auxiliary contact leading-out terminals 4A are provided, there are two first conductive elements 82A in the first plastic element 81A, and the two first conductive elements 82A are insulated by plastic material in the first plastic element 81A. Similarly, the second conductive element 92A are provided in the second plastic element 91A, and the two second conductive elements 92A are insulated by plastic material in the second plastic element 91A.

In this embodiment, the coil leading-out terminal 5A is fixed in the lower flange 32A of the coil bobbin 3A by insert-injection-molding, that is, when the coil bobbin 3A is injection-molded, a middle part of the coil leading-out terminal 5A is directly injected therein.

In this embodiment, the first conductive element 82A is fixed in the first plastic element 81A by insert-injection-molding, that is, when the first plastic element 81A is injection-molded, a middle part of the first conductive element 82A is directly injected therein, and the electrical connection sockets 821A and 822A of the first conductive element 82A are exposed.

In this embodiment, the first plastic element 81A is provided with a hole for making place 811A adapted to the main contact leading-out terminal 2A, and the two holes for making place 811A of the first plastic element 81A are correspondingly matched with the two main contact leading-out terminals 2A, thereby positioning the first plastic element 8A on the top surface of the cover 1A.

In this embodiment, the second conductive element 92A is fixed in the second plastic element 91A by insert-injection-molding. That is, when the second plastic element 91A is injection-molded, a middle part of the second conductive element 92A is directly injected therein, and the pin structure 921A and the leading-out pin 922A of the second conductive element 82A are exposed.

In this embodiment, the relay also includes a U-shaped yoke 63A surrounded by a bottom surface and two opposite sides of the coil bobbin 3A. The second connecting assembly 9A corresponds to an outer side of one of the U-shaped side walls 631A of the U-shaped yoke 63A, and a surface of the second plastic element 91A facing towards the U-shaped yoke 63A is provided with two plastic protrusions 911A, one of the U-shaped side walls of the U-shaped yoke 63A is provided with two through holes 632A which may be matched with the plastic protrusions 911A of the second plastic element 91A, and the plastic protrusion 911A of the second plastic element 91A is in interference fit with the through hole 632A of the U-shaped yoke 63A, so that the second connecting assembly 9A and the U-shaped yoke 63A are fixed with each other.

In this embodiment, the leading-out section 51A of the coil leading-out terminal 5A is bent into an upward L-shape; the leading-out pin 922A of the second conductive element is bent into a U-shape, and is arranged with the leading-out section 51A of the coil leading-out terminal 5A to form a plug-in structure with pins facing upwards.

In the high-voltage DC relay of the present disclosure, the first connecting assembly 8A is disposed on a top surface of the cover 1A, and the second connecting assembly 9A is disposed on side surfaces of the cover 1A and the coil bobbin 3A; an upper end of the second conductive element 92A is provided as a pin structure 921A, and a lower end of the second conductive element 92A is provided as a leading-out pin 922A which leads out in the same direction as the leading-out section of the coil leading-out terminal; both ends of the first conductive element 82A are respectively provided as electrical connection sockets 821A, 822A, and are respectively inserted and then welded and fixed with the auxiliary contact leading-out terminal 4A and the pin structure 921A of the second conductive element. According to the structure of the present disclosure, the auxiliary contact leading-out terminal 4A is led from the top end of the cover to the bottom end of the relay by matching of two separate parts (i.e., the first connecting assembly and the second connecting assembly), thereby solving a problem that the auxiliary connecting assembly has two contradictory assembling directions, and realizing reliable fixing and accurate positioning of the connecting assembly; also, avoiding that when one auxiliary connecting assembly is provided, the conductive element is difficult to be formed at 90 degrees at the bending position, preventing that the leading-out pin at a bottom connecting part (customer plug connector) cannot be effectively and reliably fixed since the part will rebound after bent at a R angle, which leads to difficulties in subsequent assembly of the housing, and further avoiding production problems such as shaking of the connecting assembly during the turnover process.

Second Embodiment

Figure 29:
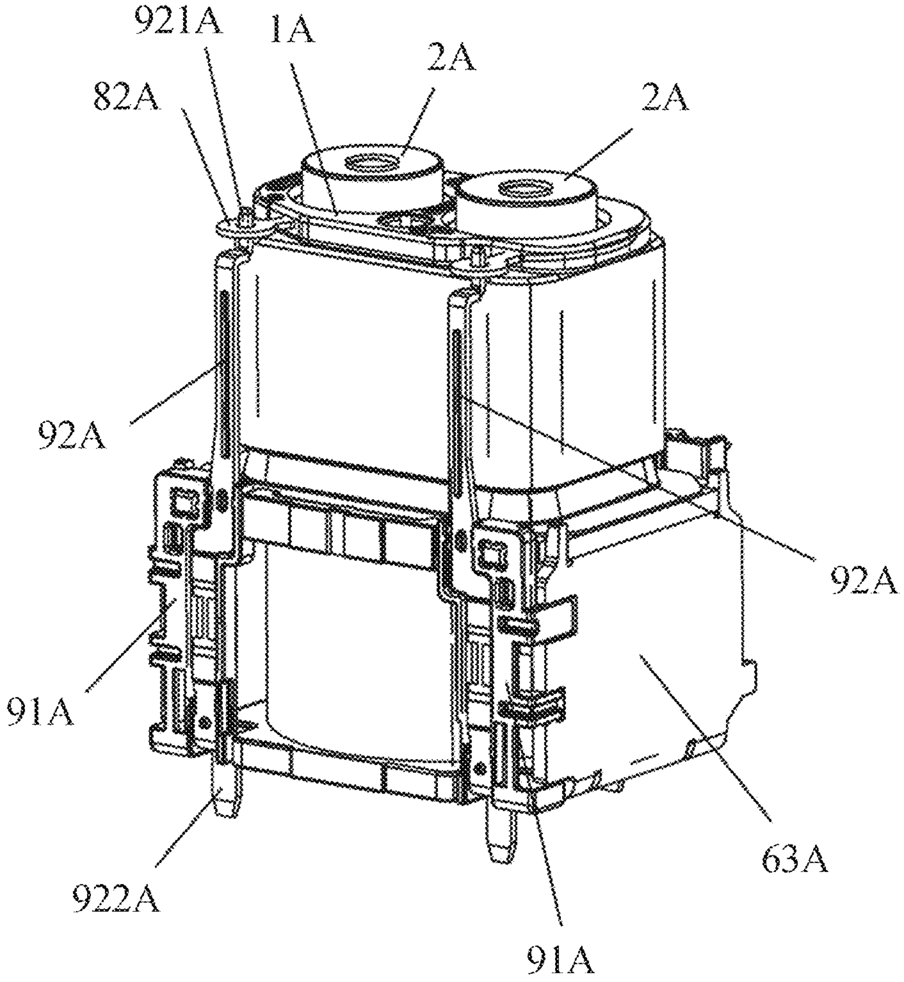
FIG. 29 is a schematic structural perspective view of a second embodiment of the present disclosure.
Figure 30:
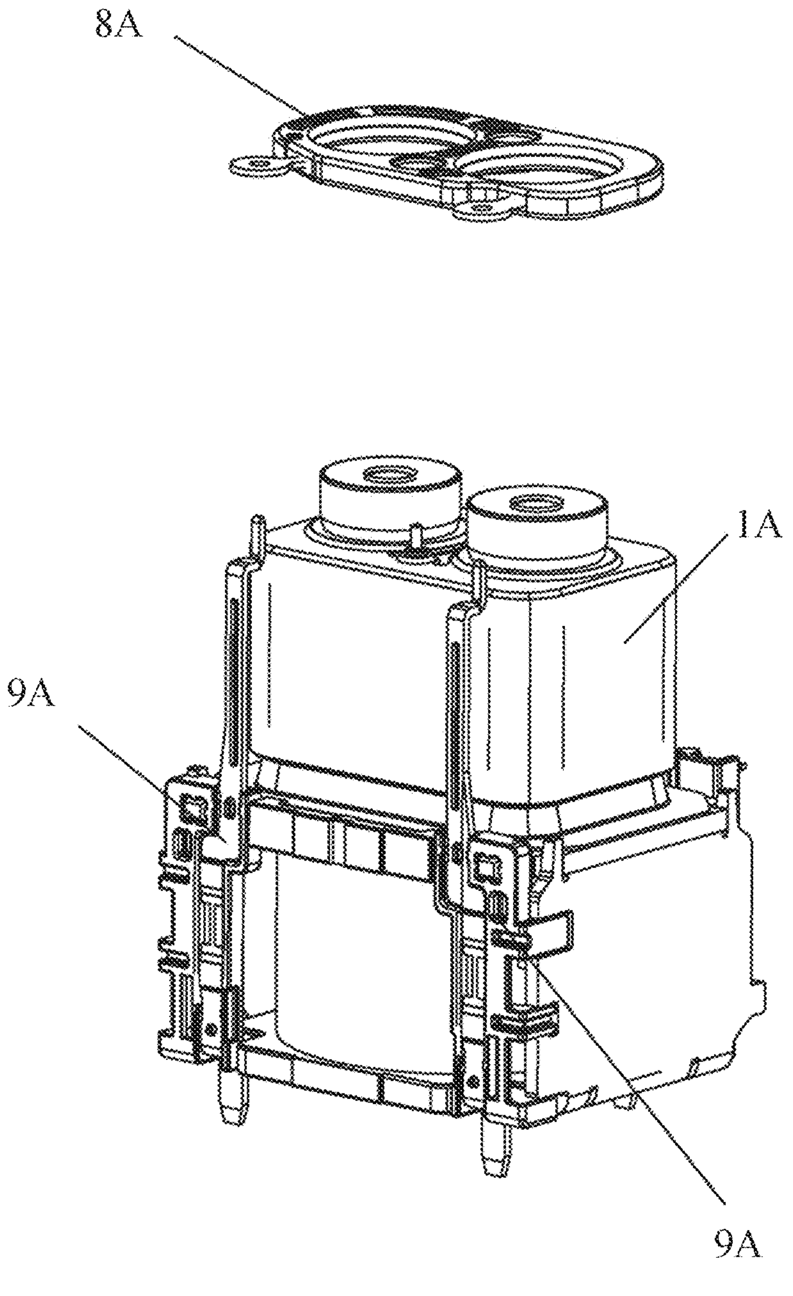
FIG. 30 is a schematic structural perspective view of the second embodiment of the present disclosure, in which the first connecting assembly is in a separated state.
Figure 31:
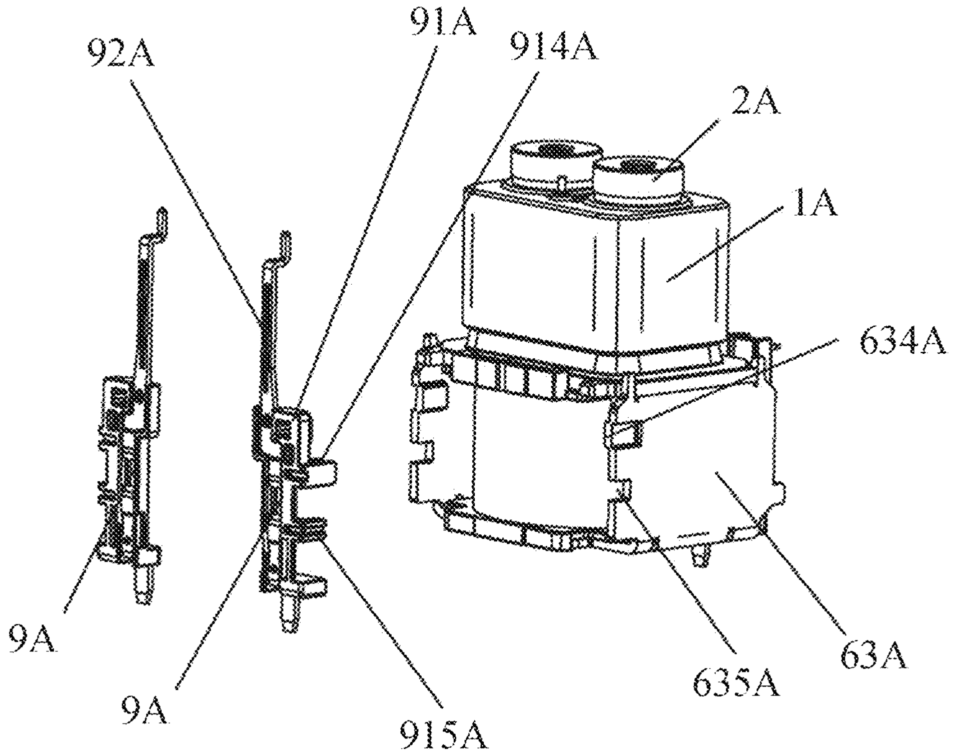
FIG. 31 is a schematic structural perspective view of the second embodiment of the present disclosure, in which the second connecting assembly is in a separated state, without the first connecting assembly.
Figure 32:
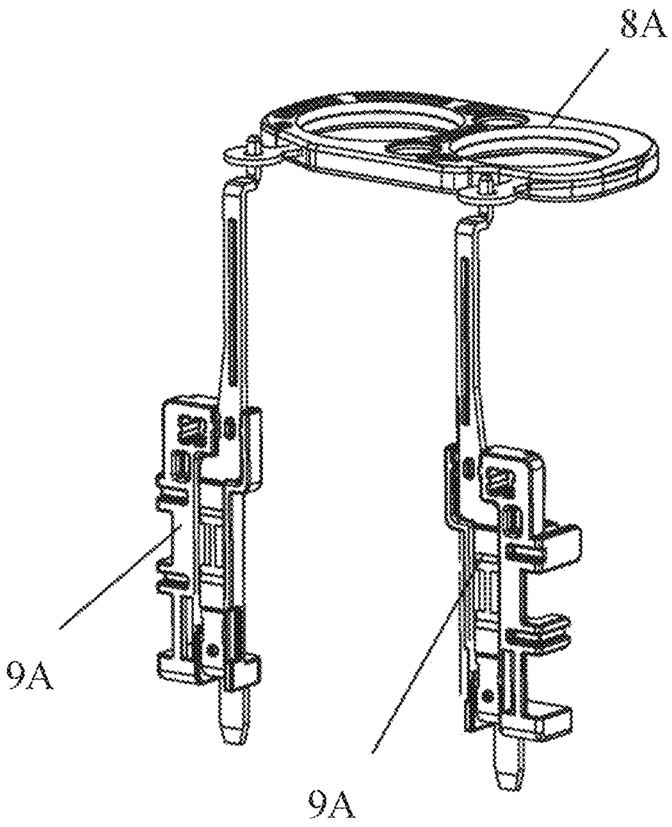
FIG. 32 is a schematic structural perspective view of the second embodiment of the present disclosure, in which the first connecting assembly is matched with the second connecting assembly.
Figure 33:
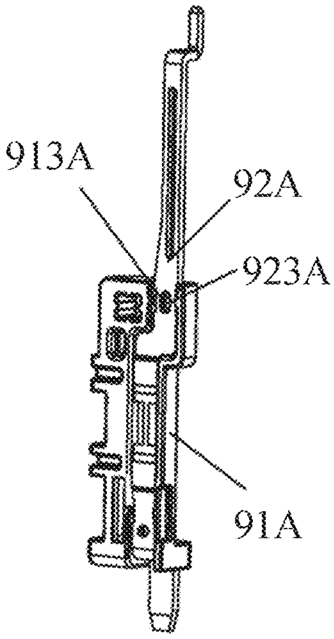
FIG. 33 is a schematic structural perspective view of a second connecting assembly of the second embodiment of the present disclosure.
Figure 34:
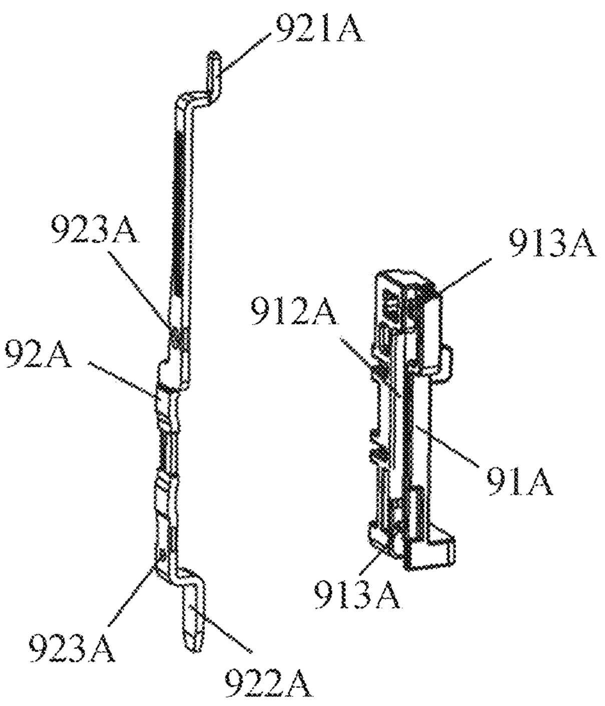
FIG. 34 is structural perspective exploded schematic view of the second connecting assembly of the second embodiment of the present disclosure.
Figure 35:
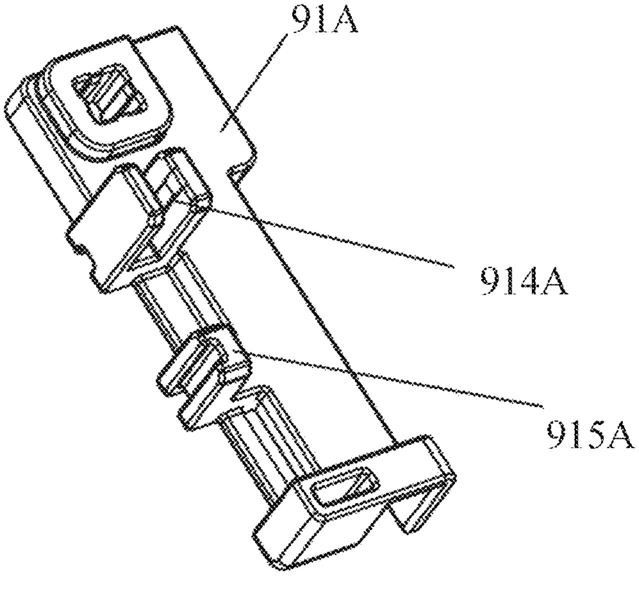
FIG. 35 is a schematic structural perspective view of a second plastic element of the second connecting assembly of the second embodiment of the present disclosure.

As shown in FIGS. 29 to 35, a high-voltage DC relay of the present disclosure is different from the first embodiment in that the second plastic element 91A is a separate part which is pre-injection-molded, the second plastic element 91A is provided with an embedded groove 912A, and the second conductive element 92A is embedded in and in interference fit with the embedded groove 912A of the second plastic element 91A.

In this embodiment, two positioning projections 913A are provided in the embedded groove 912A of the second plastic element 91A, and two positioning holes 923A are provided in the second conductive element 92A corresponding to the two positioning projections 913A. The second conductive element 92A may be positioned in the embedded groove 912A of the second plastic element 91A through matching of the positioning hole 923A and the positioning projection 913A of the second plastic element 91A.

In this embodiment, two second connecting assemblies 9A are provided, and the two second connecting assemblies 9A are correspondingly arranged next to the U-shaped side wall of the U-shaped yoke 63A respectively. A boss or a slot which may be matched with each other is arranged between a surface of the second plastic element 91A facing away from the embedded groove and an edge of the U-shaped side wall of the U-shaped yoke 63A, and the second plastic element 91A is fixed with the U-shaped yoke 63A by matching the boss and the groove which correspond to each other. Specifically, one slot 914A and one boss 915A are provided in the second plastic element 91A, and a recessed boss 633A and a notched slot 634A are provided at an edge of the U-shaped side wall of the U-shaped yoke 63A. When the second connecting assembly 9A is fixed with the U-shaped yoke 63A, the slot 914A of the second plastic element 91A is matched with the boss 633A of the U-shaped yoke 63A, and the boss 915A of the second plastic element 91A is matched with the slot 634A of the U-shaped yoke 63A.

These are only the preferred embodiments of the present disclosure, and do not limit the present disclosure in any way. Although the present disclosure has been disclosed in the preferred embodiment, it is not intended to limit the present disclosure. Any person skilled in the art can make many possible changes and modifications to the technical solution of the present disclosure by using the above disclosed technical contents without departing from the scope of the technical solution of the present disclosure, or modify them into equivalent embodiments. Therefore, any simple modifications, equivalent changes and modifications made to the above embodiments according to the technical essence of the present disclosure without departing from the contents of the technical solution of the present disclosure shall fall within the scope of protection of the technical solution of the present disclosure.

What is claimed is:

1. A high-voltage DC relay, comprising a cover, a main contact leading-out terminal, a coil bobbin, an auxiliary contact leading-out terminal and a coil leading-out terminal, wherein the cover and the coil bobbin are arranged up and down; two main contact leading-out terminals and two auxiliary contact leading-out terminals are respectively fixed on a top wall of the cover and their bottom ends respectively extend into a cavity of the cover; a winding shaft of the coil bobbin is vertically arranged; the coil leading-out terminal is mounted in a flange of the coil bobbin, and a leading-out section of the coil leading-out terminal is led outwards;

wherein the high-voltage DC relay also comprises a first connecting assembly and a second connecting assembly, the first connecting assembly being composed of a first plastic element and a first conductive element arranged in the first plastic element, the second connecting assembly being composed of a second plastic element and a second conductive element arranged in the second plastic element, wherein the first connecting assembly is disposed on a top surface of the cover, and the second connecting assembly is disposed on side surfaces of the cover and the coil bobbin; an upper end of the second conductive element is provided as a pin structure, and a lower end of the second conductive element is provided as a leading-out pin which leads out in the same direction as the leading-out section of the coil leading-out terminal, both ends of the first conductive element are respectively provided as electrical connection sockets, and are respectively inserted and then welded and fixed with the auxiliary contact leading-out terminal and the pin structure of the second conductive element.

2. The high-voltage DC relay according to claim 1, wherein the coil leading-out terminal is mounted in a lower flange of the coil bobbin.

3. The high-voltage DC relay according to claim 2, wherein the coil leading-out terminal is fixed in the lower flange of the coil bobbin by insert-injection-molding.

4. The high-voltage DC relay according to claim 1, wherein the first conductive element is fixed in the first plastic element by insert-injection-molding.

5. The high-voltage DC relay according to claim 1, wherein the first plastic element is provided with holes for making place adapted to the main contact leading-out terminals, and the two holes for making place are correspondingly matched with the two main contact leading-out terminals by using the first plastic element to realize positioning of the first plastic element at the top surface of the cover.

6. The high-voltage DC relay according to claim 1, wherein the second conductive element is fixed in the second plastic element by insert-injection-molding.

7. The high-voltage DC relay according to claim 6, wherein the high-voltage DC relay also comprises a U-shaped yoke, and the U-shaped yoke is surrounded by a bottom surface and two opposite sides of the coil bobbin; the second connecting assembly corresponds to an outer side of one of the U-shaped side walls of the U-shaped yoke, a surface of the second plastic element facing towards the U-shaped yoke is provided with at least one plastic protrusion, one of the U-shaped side walls of the U-shaped yoke is provided with at least one through hole which may be matched with the plastic protrusion of the second plastic element, and the plastic protrusion of the second plastic element is in interference fit with the through hole of the U-shaped yoke.

8. The high-voltage DC relay according to claim 7, wherein the leading-out section of the coil leading-out terminal is bent into an upward L-shape; the leading-out pin of the second conductive element is bent into a U-shape, and is arranged with the leading-out section of the coil leading-out terminal to form a plug-in structure with pins facing upwards.

9. The high-voltage DC relay according to claim 1, wherein the second plastic element is a separate part which is pre-injection-molded, the second plastic element is provided with an embedded groove, and the second conductive element is embedded in and in interference fit with the embedded groove of the second plastic element.

10. The high-voltage DC relay according to claim 9, wherein the embedded groove of the second plastic element is provided with at least one positioning projection, the second conductive element is provided with at least one positioning hole, and the second conductive element is positioned in the embedded groove of the second plastic element through matching of the positioning hole and the positioning projection of the second plastic element.

11. The high-voltage DC relay according to claim 10, wherein the high-voltage DC relay also comprises a U-shaped yoke, and the U-shaped yoke is surrounded by the bottom surface and two opposite sides of the coil bobbin; the second connecting assembly is correspondingly arranged next to the U-shaped side wall of the U-shaped yoke; a boss or a slot which may be matched with each other is arranged between a surface of the second plastic element facing away from the embedded groove and an edge of the U-shaped side wall of the U-shaped yoke, and the second plastic element is fixed with the U-shaped yoke by matching the boss and the groove which correspond to each other.

* * * * *